United States Patent
Kuo

[11] Patent Number: 6,145,893
[45] Date of Patent: Nov. 14, 2000

[54] CONNECTOR FOR PIPELINE

[76] Inventor: Hsien-wen Kuo, No. 93, Sec. 4, Chin-Hwa Rd., Tainan, Taiwan

[21] Appl. No.: 09/365,727

[22] Filed: Aug. 3, 1999

[51] Int. Cl.[7] .................................................. F16L 27/12
[52] U.S. Cl. .................... 285/302; 285/342; 285/348; 285/197; 137/356; 137/378; 137/768
[58] Field of Search ................................ 285/302, 342, 285/343, 348, 382.7, 197; 137/356, 378, 768

[56] References Cited

U.S. PATENT DOCUMENTS

| | | | |
|---|---|---|---|
| 2,790,652 | 4/1957 | Risley et al. | 285/342 |
| 3,074,747 | 1/1963 | Boughton | 285/342 |
| 3,369,828 | 2/1968 | Trickey | 285/302 |
| 3,451,483 | 6/1969 | Van Houtte et al. | 285/302 |
| 4,025,093 | 5/1977 | Leczycki | 285/343 |
| 4,037,864 | 7/1977 | Anderson et al. | 285/342 |
| 4,071,266 | 1/1978 | Mountford | 285/302 |
| 5,160,174 | 11/1992 | Thompson | 285/302 |

*Primary Examiner*—Eric K. Nicholson
*Attorney, Agent, or Firm*—Rosenberg, Klein & Lee

[57] ABSTRACT

A structure of a pipeline connector is mainly composed of a socket, a restriction ring, a cover ring, a fixed inner pipe, a fixed outer pipe and a stopping ring. The socket is composed of a cone shaped opening and secured with an inner pipe. The opening of the socket comprises a restriction ring and a locknut, with the fixed inner pipe secured within the socket by means of the locknut, the fixed inner pipe and the inner pipe of the fixed inner pipe been inserted through the fixed outer pipe and sleeved with a stopping ring at the end of the inner pipe so as to allow a smooth sliding of the fixed inner pipe and the fixed outer pipe, relatively.

4 Claims, 6 Drawing Sheets

CONNECTOR FOR PIPELINE

BACKGROUND OF THE INVENTION

1. Field of the Invention

This invention relates to a connector for pipeline for liquid flow therein, and more particularly to a pipeline to absorb the atmosphere change and varies along with the change ensuring a leak-free pipeline.

2. Prior Art

The conventional pipeline is formed by connecting several pipes together to form a long pipeline, as shown in FIG. 6 which has a pipe A comprises a lug A1 at its flange with a plural holes A11 thereon. And a fixed ring B sleeved onto an inner pipe C has a plural fixture apertures B1 equally spaced thereon and apart from each other for bolts to be inserted there through and secured thereat. The fixed ring B has a number of through holes B2 corresponding to the through holes A11 of the lug A1 of the pipe A. Thus, the inner pipe C inserts through the fixed ring B and the bolts B11 attached on each fixture aperture B1 are screwed tight to the flange of the inner pipe C. The fixed ring B, at this moment, will be engaged with the lug A1 of the pipe A. There are some shortcomings exist in the above-mentioned prior art, which are:

1. the tighten force lies on the bolts around the flange of the inner pipe which utilizes single contact point and is less stable;
2. the entire structure relies on the bolts insert through the pipe lug and the fixed ring which tends to loose when time consume and any movement of the earth;
3. this design utilizes bolts to hold the inner pipe may cause plastic or rubber material to deteriorate.

SUMMARY OF THE INVENTION

It is the primary object of the present invention to provide a connector for pipeline which maintains a stable condition in a various environment situation.

It is another object of the present invention to provide a connector for pipeline which lasts longer and more safe.

It is a further object of the present invention to provide a connector for pipeline which is inexpensive to produce.

DETAILED DESCRIPTION OF THE PREFERRED EMBODIMENTS

Figure 1:
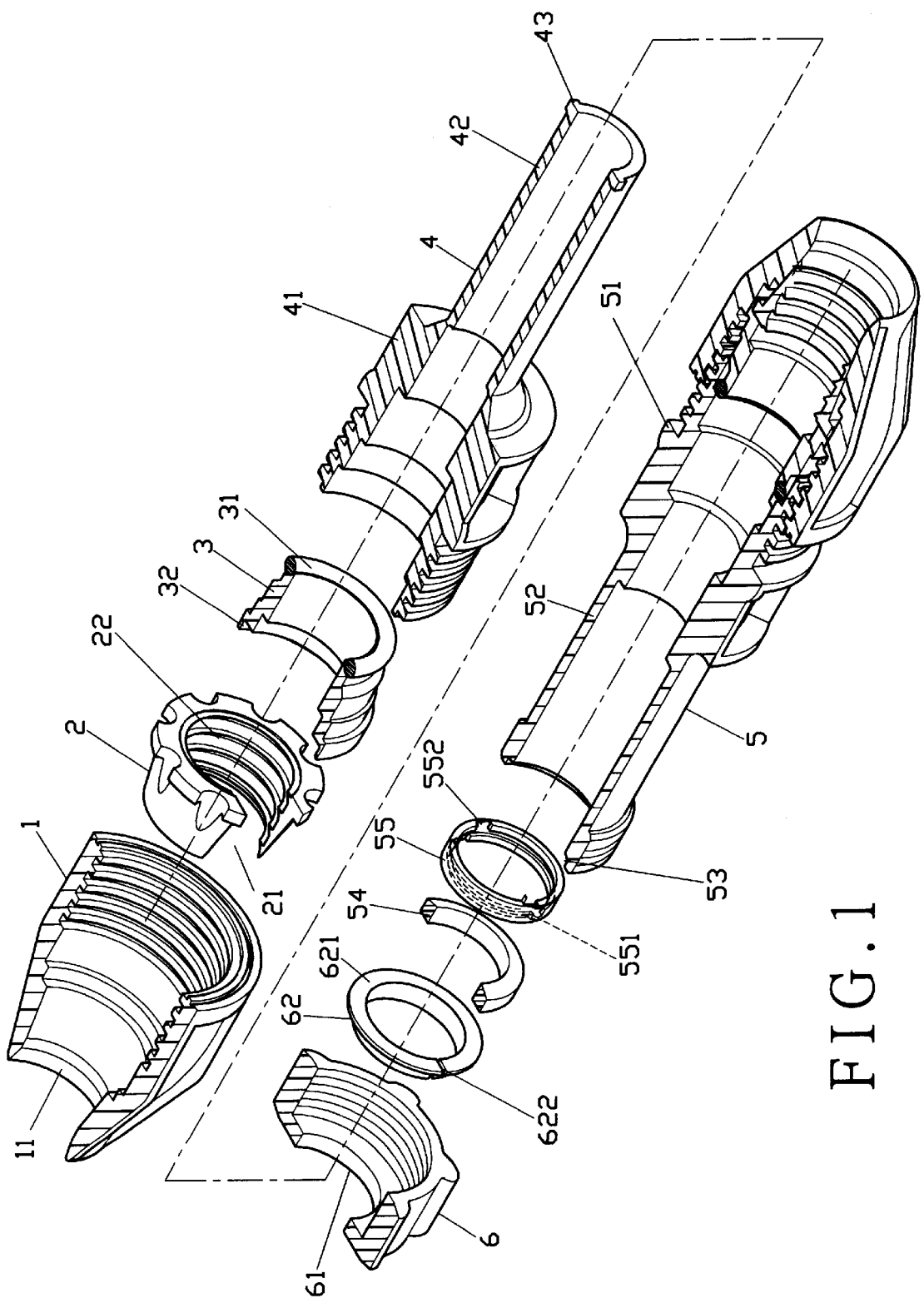
FIG. 1 is an exploded view of the present invention.
Figure 2:
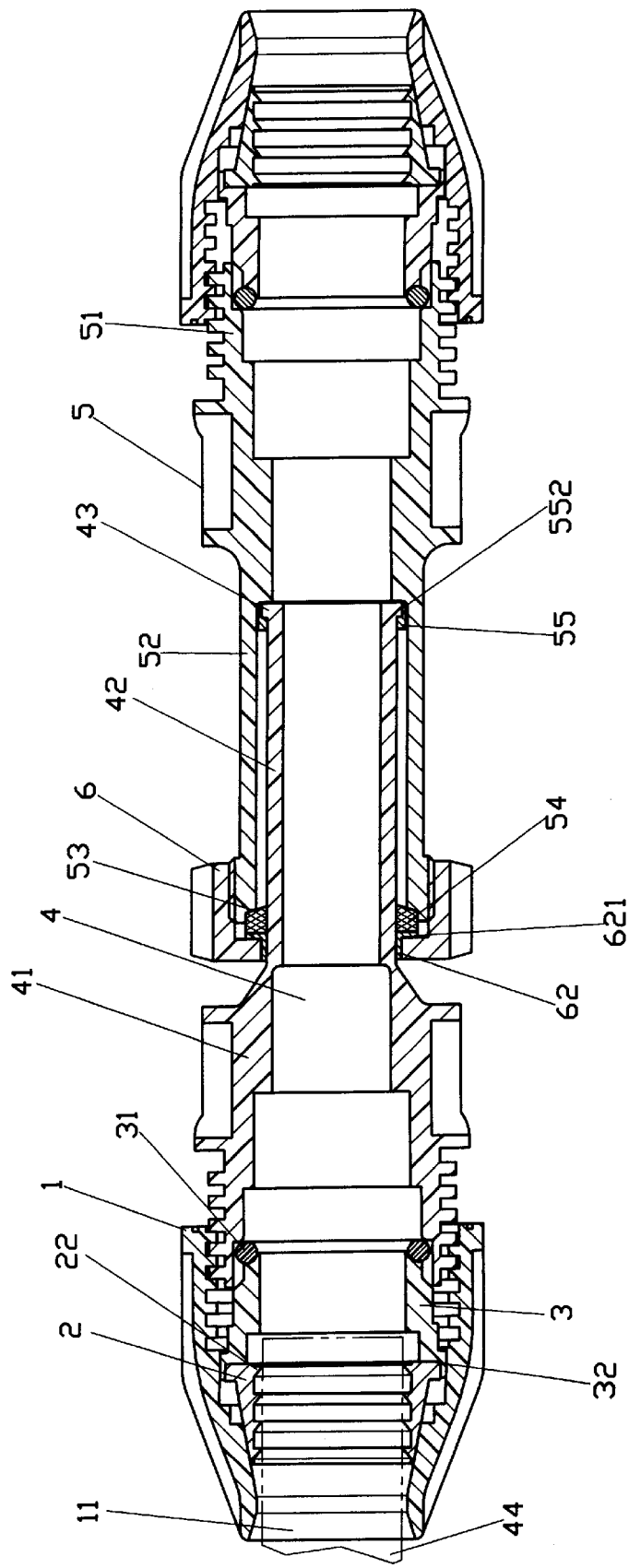
FIG. 2 is a perspective view of FIG. 1, in cross section.

The connector for pipeline, as shown in FIG. 1, comprises a socket 1, a restriction ring 2, a cover 3, a fixed inner pipe 4, a fixed outer pipe 5, a stopping ring 55, a locating cover 6, a locknut 62, with gaskets 31 and pressing device 54 to form the present invention.

The socket 1 is a hollow body, with a cone shaped inner opening 11 at one end and an inner threaded portion at the opposite end.

The restriction ring 2 is a circular body having a notch 21 at one side, and has a number of locating inner flange 22 extending from the inner ring and spaced from each other.

The cover ring 3 is formed with a cone barrel having a gasket 31 at the smaller size end and a stopper 32 at the larger end.

The fixed inner pipe 4 has a hollow body with a coupling body 41 at the front end, and an inner pipe 42 at the other end which is in a reduced size. The inner pipe 42 is formed with a pair of stoppers 43 at the end most.

The fixed outer pipe 5 also has a coupling body 51 at one end which is able to be threaded to the socket 1. An outer pipe 52 with outer threads is formed at the other end with a pit 53 at the inner flange adapted to accommodate a pressing device 54 therein.

The stopper 55 is formed with an inner diameter in correspondence with the outer diameter of the inner pipe 42 of the fixed inner pipe 4, and a pair of grooves 551 corresponding to the stoppers 43 and each groove 551 has a notch 552.

The locating cover 6 is a threaded cover with a through hole 61 corresponding to the inner pipe 42 of the fixed inner pipe 4.

The locknut 62 has a flange 621 with a notch 622 at one side, thereof.

To assemble, the restriction ring 2 covers the stopper 32 at the inner flange of the cover ring 3, with the side having gasket 31 seating in the coupling body 41 of the fixed inner pipe 4, inserting the pipe 44 through the opening 11 of the socket 1 and threads the socket 1 along with the pipe 44 to the coupling body 41. The pipe 44, at this moment, inserted through the restriction ring 2 and the cover ring 3, when the coupling body 41 threads are tightened with the socket 1, the cover ring 3 urged by the coupling body 41 of the fixed inner pipe 4, pushes the restriction ring 2 towards the opening 11 of the socket 1. The restriction ring 2 will be squeezed by the shrinking body of the pipe 44 to force the locating inner flange of the restriction ring 2 engaged to the outer surface of the pipe 44. The locating cover 6, the locknut 62 and the pressing device 54 are sleeved onto the inner pipe 42 of the fixed inner pipe 4, and then the stopping ring 55 is sleeved to the stoppers 43 with the notches 552 of the stopping ring 55 in correspondence to the stoppers 43, then the stopping ring 55 is rotated to an angle to guide the stoppers 43 into the grooves 551, this secures the stopping ring 55 to the end of the inner pipe 42 which will slide into the outer pipe 52 of the fixed outer pipe 5 and is fixed there by means of the locating cover 6 threaded onto the threaded end of the fixed outer pipe 5 with the stopping flange 621 of the locknut 62 engaged with the outer pipe 52 of the fixed outer pipe 5 forming a leak-free connection. To extend the pipeline, another socket 1 is connected to the coupling body 51, and the above-mentioned procedures are repeated.

Figure 3:
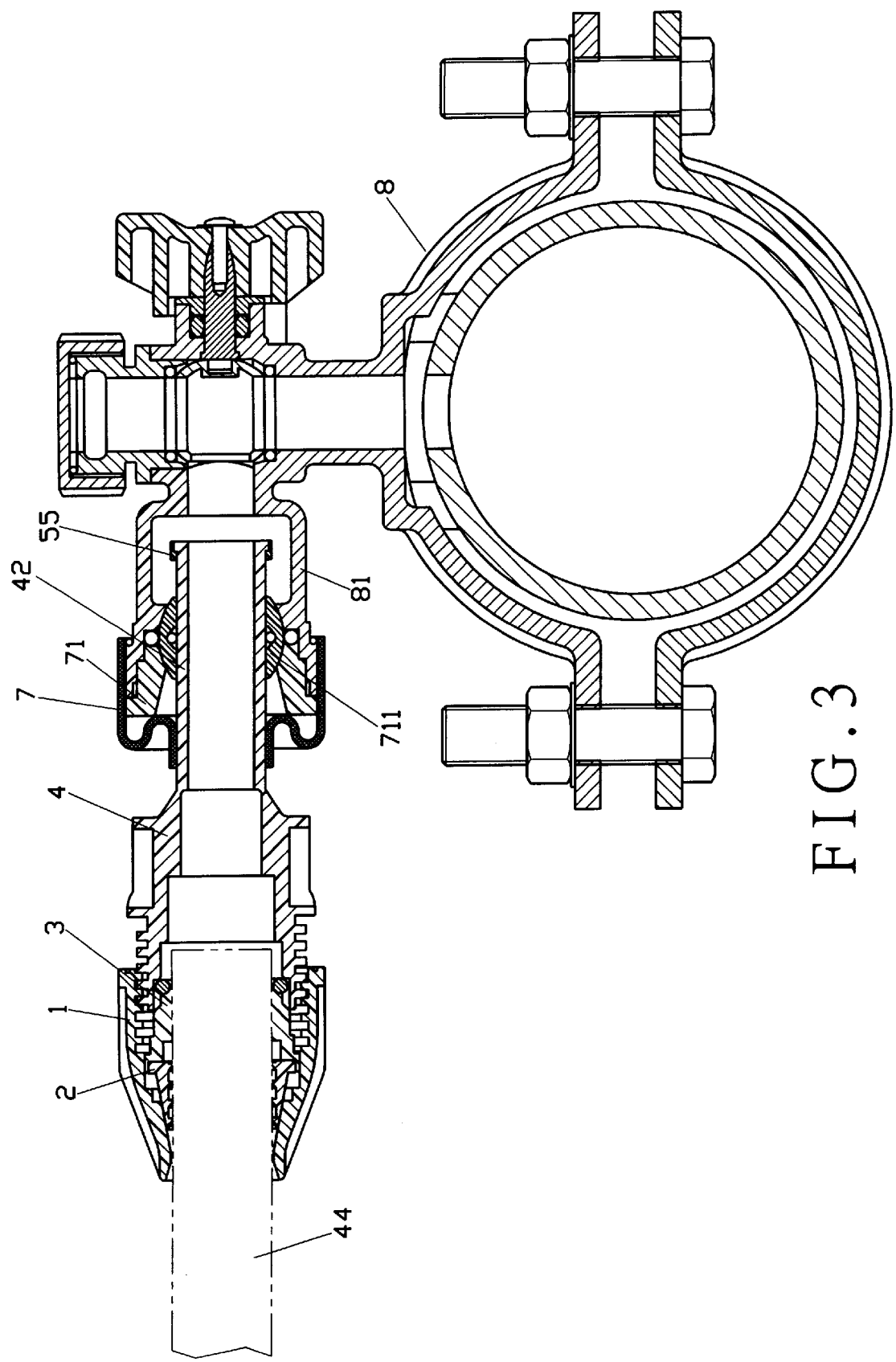
FIG. 3 is a top cross-sectional view.
Figure 4:
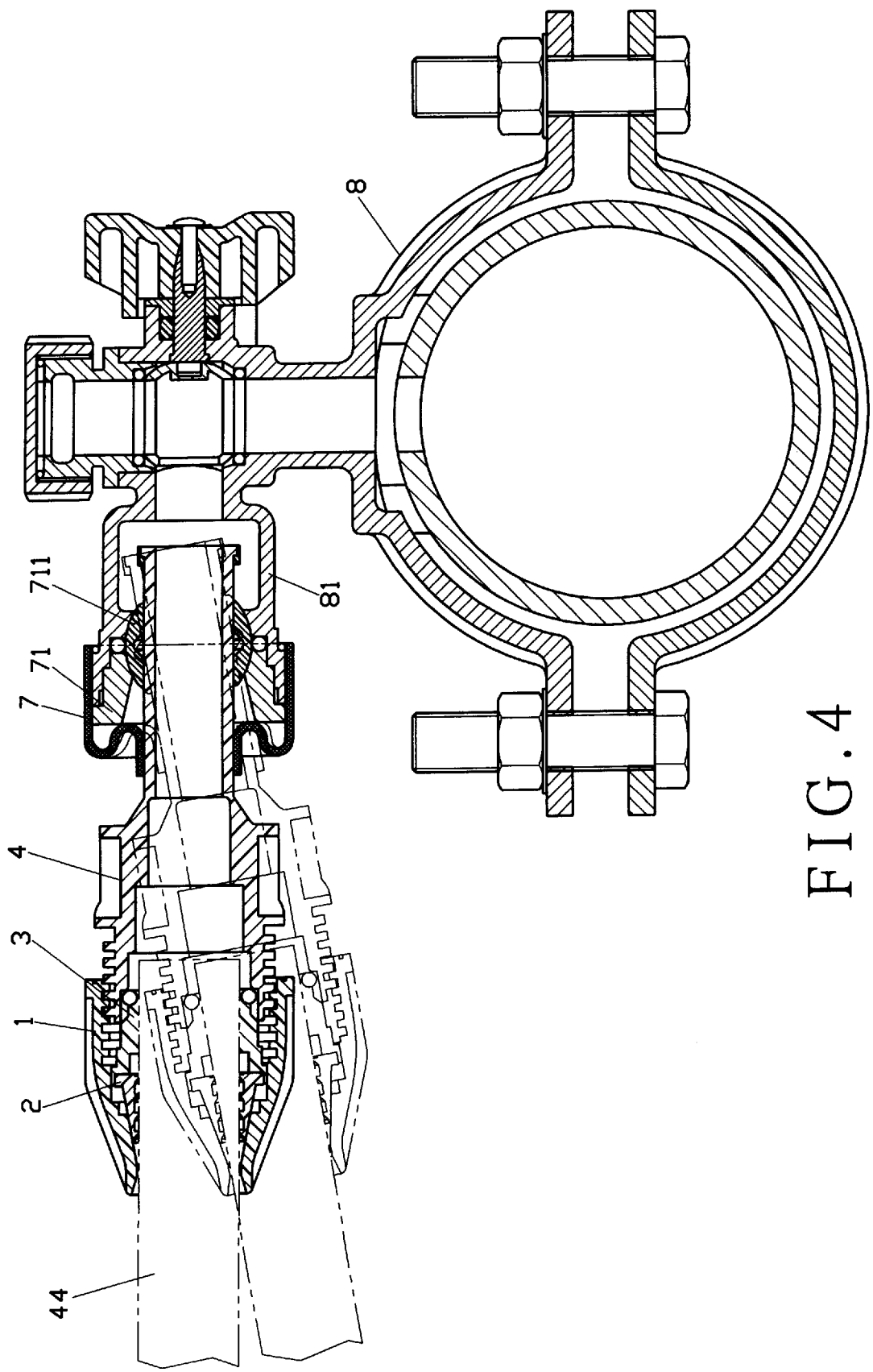
FIG. 4 is a view similar to FIG. 3, with a pipe connected by the present invention in a rocking status.

When an earthquake occurs, the fixed outer pipe 5 and the fixed inner pipe 4 are slidable with respect to each other to provide flexibility, upon the fixed inner pipe 4 reaching its out most, the stopping ring 55 and the pressing device 54 confines any further movement. Further, when it is applied to a T fitting 8, as shown in FIG. 3, comprises a socket 1, a restriction ring 2, a cover ring 3 and a fixed inner pipe 4, the flange of the inner pipe 42 is covered with a dust cover 7 which comprises a socket 71 and a valve 711, the end of the inner pipe 42 is sleeved with the stopping ring 55, the inner pipe 42 of the fixed inner pipe 4 is connected to the water outlet 81 of the T fitting 8, and the valve 711 is secured with the socket 71 and a gasket to the water outlet 81 of the T fitting 8. Thus, the dust cover 7 will be engaged with the water outlet 81 to prevent foreign objects from entering. When the fixed inner pipe 4 slides, the stopping ring 55 at the end most of the inner pipe 42 will be against the valve 711 to confine movement. When an earthquake occurs, as shown in FIG. 4, the valve 711 within the water outlet 81 is linked to move along with the fixed inner pipe 4 to absorb the energy.

Figure 5:
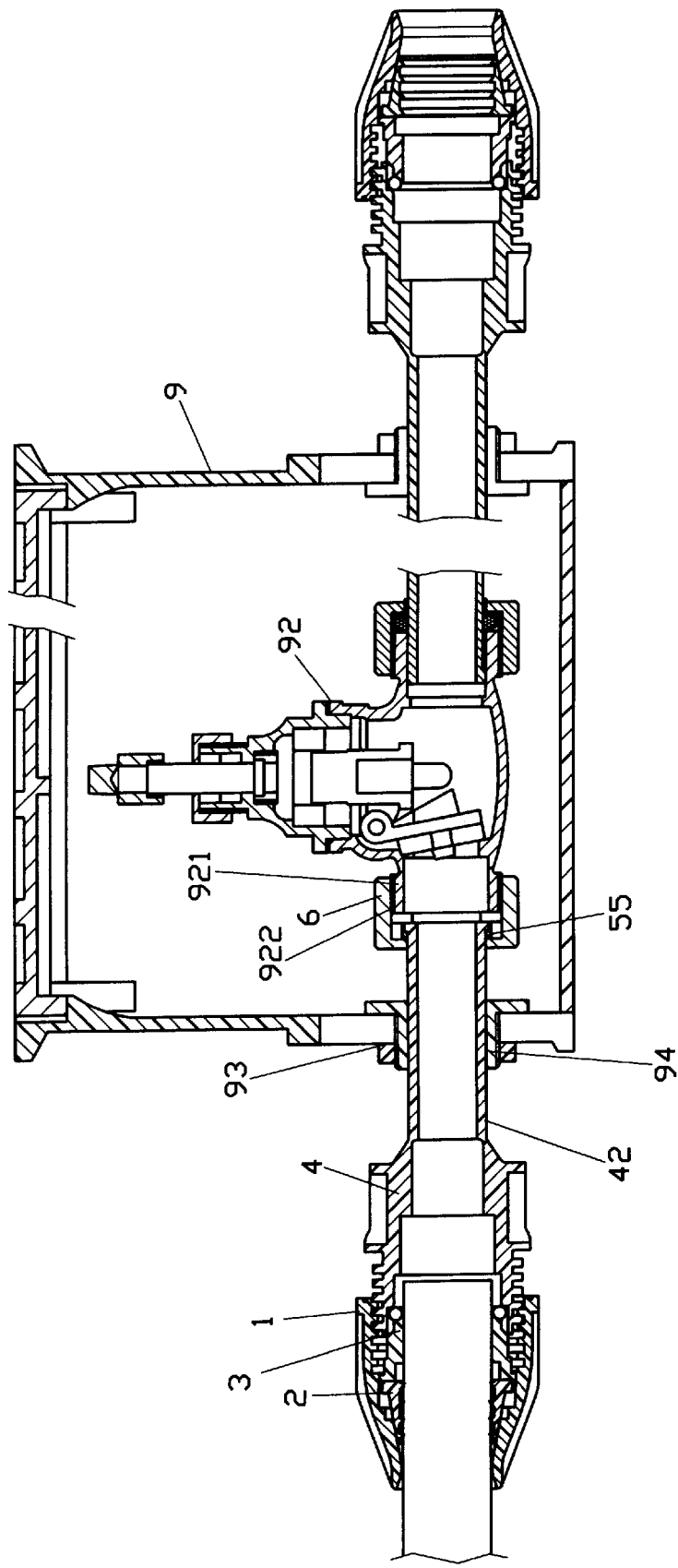
FIG. 5 is another embodiment.
Figure 6:
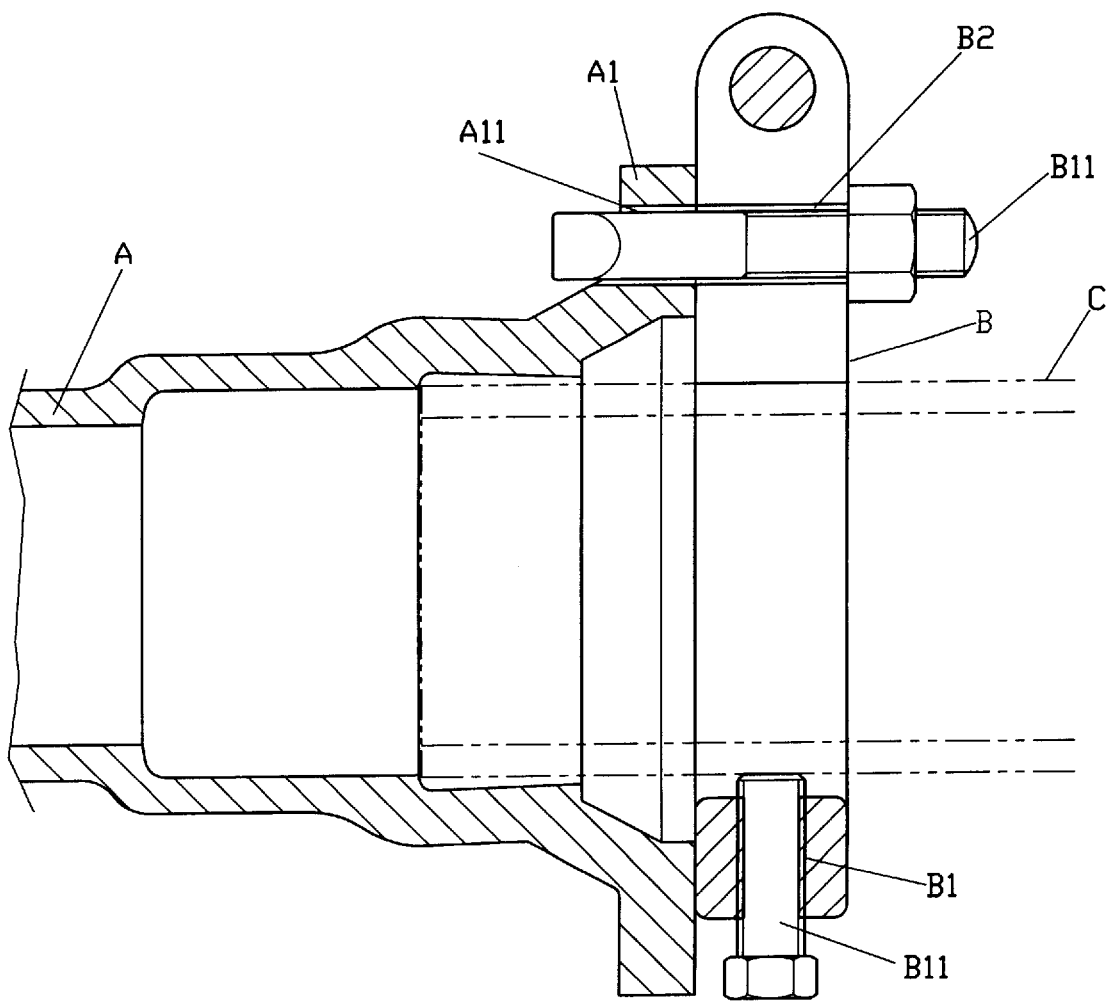
FIG. 6 is a cross-sectional view of a prior art coupling.

Still further, when the present invention is installed in a water meter box 9, as shown in FIG. 5, two water outlet 921 are located at respective sides of a stop valve 92 with outer threads 922 on the water outlet 921 and capped with the locating cover 6. A preset through hole 93 of the meter box 9 has a socket 1, a restriction ring 2, a cover ring 3 and a fixed inner pipe 4 with the inner pipe 42 extending through the through hole 93 with a fixture 94 sleeved onto the flange of the through hole 93 to maintain the fixed inner pipe 4 in a fixed position. The locating cover 6 is secured on the inner pipe 42 which has an end sleeved with the stopping ring 55 and threaded with the locating cover 6 and the fixed inner pipe 4 to the water outlet 921 of the stop valve 92.

What is claimed is:

1. A pipeline connector comprising:

a coupling body having threads formed on one longitudinal end thereof and an inner pipe extending from an opposing longitudinal end, said coupling body having a first bore extending between said opposing longitudinal ends, said inner pipe having a second bore extending longitudinally therethrough and in fluid communication with said first bore, said inner pipe having a pair of stoppers formed on a distal end thereof;

a socket member having threads formed on one end thereof for coupling with said threads of said coupling body and a substantially conically shaped bore extending longitudinally therethrough;

a restriction ring disposed within said bore of said socket member and having a notch formed through a side thereof;

a cover ring disposed adjacent said restriction ring and having a gasket disposed at a first end thereof, said first end being seated in said first bore and said cover ring having a stopper formed on an opposing second end thereof for contiguous contact with said restriction ring, wherein tightening of said socket member onto said coupling body clampingly engages said restriction ring to a pipe inserted into said first bore through said substantially conical bore of said socket member and respective openings in said restriction ring and said cover ring;

a stopping ring mounted to said pair of stoppers of said inner pipe;

an outer pipe having a threaded first end and a bore extending longitudinally therefrom, at least a portion of said inner pipe being sleeved in said outer pipe bore;

a pressing device sleeved on said inner pipe and disposed adjacent said first end of said outer pipe; and, a locating cover threadedly engaged with said threads of said outer pipe and pressing said pressing device to provide sealing engagement with an inner surface of said outer pipe and an outer surface of said inner pipe, said inner pipe being slidable relative to said outer pipe.

2. The pipeline connector as recited in claim 1 further comprising:

a second coupling body integrally formed on a second end of said outer pipe, said second coupling body having a threaded distal end and a third bore formed therein in fluid communication with said outer pipe bore;

a second socket member having threads formed on one end thereof for coupling with said threads of said second coupling body and a substantially conically shaped bore extending longitudinally therethrough;

a second restriction ring disposed within said bore of said second socket member and having a notch formed through a side thereof;

a second cover ring disposed adjacent said second restriction ring and having a second gasket disposed at a first end thereof, said first end of said second cover ring being seated in said third bore and said second cover ring having a second stopper formed on an opposing second end thereof for contiguous contact with said second restriction ring.

3. The pipeline connector as recited in claim 1 where said stopping ring includes a pair of internal grooves and a pair of notches formed in respective open communication with said pair of grooves for respectively receiving said pair of stoppers therein to secure said stopping ring to said inner pipe.

4. A pipeline connector comprising:

a coupling body having threads formed on one longitudinal end thereof and an inner pipe extending from an opposing longitudinal end, said coupling body having a first bore extending between said opposing longitudinal ends, said inner pipe having a second bore extending longitudinally therethrough and in fluid communication with said first bore, said inner pipe having a pair of stoppers formed on a distal end thereof;

a socket member having threads formed on one end thereof for coupling with said threads of said coupling body and a substantially conically shaped bore extending longitudinally therethrough;

a restriction ring disposed within said bore of said socket member and having a notch formed through a side thereof;

a cover ring disposed adjacent said restriction ring and having a gasket disposed at a first end thereof, said first end being seated in said first bore and said cover ring having a stopper formed on an opposing second end thereof for contiguous contact with said restriction ring, wherein tightening of said socket member onto said coupling body clampingly engages said restriction ring to a pipe inserted into said first bore through said substantially conical bore of said socket member and respective openings in said restriction ring and said cover ring;

a stopping ring mounted to said pair of stoppers of said inner pipe;

an outlet portion of a fitting having a bore extending longitudinally therein, at least a portion of said inner pipe being sleeved in said outlet portion bore;

a valve member sleeved on said inner pipe and disposed in said outlet portion bore; and, a second socket member engaged with said fitting within said outlet portion bore to secure said valve member therein, said inner pipe being slidable and angularly displaceable relative to said outlet portion of said fitting.

* * * * *